United States Patent
Saint-Jalmes et al.

(10) Patent No.: US 7,395,989 B2
(45) Date of Patent: Jul. 8, 2008

(54) AIRCRAFT FUSELAGE AND CORRESPONDING AIRCRAFT

(75) Inventors: Bruno Saint-Jalmes, Toulouse (FR); André Rezag, Toulouse (FR); Jason Zaneboni, Toulouse (FR)

(73) Assignee: Airbus, Blagnac (FR)

( * ) Notice: Subject to any disclaimer, the term of this patent is extended or adjusted under 35 U.S.C. 154(b) by 0 days.

(21) Appl. No.: 11/311,548

(22) Filed: Dec. 20, 2005

(65) Prior Publication Data
US 2006/0214057 A1   Sep. 28, 2006

Related U.S. Application Data

(60) Provisional application No. 60/645,049, filed on Jan. 21, 2005.

(30) Foreign Application Priority Data
Dec. 20, 2004 (FR) .................. 04 13547

(51) Int. Cl.
*B64C 1/20* (2006.01)

(52) U.S. Cl. .............. 244/118.1; 244/118.5; 244/118.6; 244/119

(58) Field of Classification Search ............. 244/118.5, 244/118.6, 117 R, 118.1, 119
See application file for complete search history.

(56) References Cited

U.S. PATENT DOCUMENTS

| | | | | |
|---|---|---|---|---|
| 3,142,461 | A * | 7/1964 | Tomlinson | 244/137.1 |
| 3,405,893 | A * | 10/1968 | Rajau et al. | 244/119 |
| 3,578,274 | A * | 5/1971 | Ginn et al. | 244/118.6 |
| 4,674,712 | A * | 6/1987 | Whitener et al. | 244/119 |
| 5,086,996 | A * | 2/1992 | Roeder et al. | 244/119 |
| 5,088,661 | A | 2/1992 | Whitener | |
| 5,383,630 | A * | 1/1995 | Flatten | 244/118.6 |
| 5,893,535 | A * | 4/1999 | Hawley | 244/119 |
| 6,047,923 | A * | 4/2000 | Lafferty | 244/15 |

(Continued)

FOREIGN PATENT DOCUMENTS

EP    0 035 955    9/1981

(Continued)

OTHER PUBLICATIONS

International Air Transport Association (IATA) ULD Technical Manual (pp. 6-9) 18th Edition Effective May 1, 2003.

*Primary Examiner*—J. Woodrow Eldred
(74) *Attorney, Agent, or Firm*—Oblon, Spivak, McClelland, Maier & Neustadt, P.C.

(57) ABSTRACT

An aircraft fuselage includes an outer skin and at least one main deck separating an interior space of the aircraft fuselage longitudinally into a first space and a second space. At least one portion of the first space is divided into at least three longitudinal zones, and the at least three longitudinal zones include at least one central zone and at least two lateral zones. The at least one central zone is divided into three sectors, and the three sectors include a front sector, a central sector, and a rear sector. The at least two lateral zones include a first and second lateral zone configuration, the front sector includes a first and second front sector configuration, the central sector includes a first and second central sector configuration, and the rear sector includes a first and second rear sector configuration.

27 Claims, 5 Drawing Sheets

U.S. PATENT DOCUMENTS

| | | | |
|---|---|---|---|
| 6,302,358 B1 * | 10/2001 | Emsters et al. | 244/137.1 |
| 6,394,392 B1 * | 5/2002 | Lafferty | 244/118.1 |
| 6,568,632 B2 * | 5/2003 | Page et al. | 244/36 |
| 6,578,798 B1 * | 6/2003 | Dizdarevic et al. | 244/199.1 |
| 6,595,466 B2 * | 7/2003 | Depeige et al. | 244/118.3 |
| 6,708,924 B2 * | 3/2004 | Page et al. | 244/36 |
| 7,093,798 B2 * | 8/2006 | Whelan et al. | 244/120 |
| 7,107,755 B2 * | 9/2006 | El Hamel et al. | 60/224 |
| 2002/0145075 A1 * | 10/2002 | Page et al. | 244/36 |
| 2003/0192986 A1 * | 10/2003 | Page et al. | 244/36 |
| 2004/0173723 A1 | 9/2004 | Looker | |
| 2004/0195454 A1 * | 10/2004 | Page et al. | 244/120 |
| 2005/0167546 A1 * | 8/2005 | Jones et al. | 244/118.5 |
| 2005/0178912 A1 * | 8/2005 | Whelan et al. | 244/120 |

FOREIGN PATENT DOCUMENTS

| | | |
|---|---|---|
| EP | 1 167 183 | 1/2002 |
| EP | 1 247 734 | 10/2002 |
| EP | 1 332 961 | 8/2003 |
| EP | 1 413 513 | 4/2004 |
| FR | 1 460 060 | 11/1966 |
| GB | 991721 | 5/1965 |
| GB | 1 439 086 | 6/1976 |
| WO | 97/30893 | 8/1997 |

* cited by examiner deck. Depending on requirements, the interior space of the fuselage can be laid out to hold more or fewer passengers and a remainder in freight.

The central zone or zones can be laid out in permanent manner or else it also can be adjustable to hold passengers and/or freight, according to preference. This central zone likewise can be adapted to the layout of the lateral zones. As emerges in particular from the description below, the central zones can hold modules that are used to enhance passenger comfort when at least one lateral zone is holding passengers. It can be a matter of comfort units already known aboard aircraft, such as storage areas, sanitary facilities (showers, bathrooms, etc.) or else even modules forming compartments making it possible to accommodate one or more passengers and comprising in particular one or more berths. Many other units can be contemplated. As emerges from the foregoing, a great adjustment capability can be obtained in a fuselage according to the invention.

In this layout according to the invention, at least one central zone is adapted to hold freight over at least one portion of its length. This contributes to the profitability of the space. The fact of providing for freight at the center of the fuselage makes it possible, in particular in the case in which passengers are placed in at least one lateral zone, to load modules for passenger comfort and for on-board service into the aircraft, in the same manner that a pallet or a freight container is loaded. It concerns, for example, kitchens (generally referred to by the English term "galleys"), storage areas, a bar, etc. Comfort units then can be put in on request, without encroaching on the space provided for passenger seating. These units are easily accessible since they are in immediate proximity to the seats. In addition, when the passengers are sitting in the lateral zones on both sides of the central zones, these comfort modules are placed amid the passengers. Thus, for example, by arranging two galleys in the center of the aircraft, amid the passengers to be served, service can be more rapid because the flight personnel have to do less moving around. Therefore this also contributes to a better economic profitability for the aircraft.

The loading of freight into the central zones is facilitated by virtue of the aisle provided in at least one lateral zone for the passage in a transverse direction of the freight placed in a central zone. The aircraft fuselage then can be equipped with lateral cargo doors and it is not necessary to provide a door for the loading of freight intended for the central zones at the rear of the aircraft.

In one embodiment of the invention, at least one central zone is divided into three sectors, a front sector adapted to hold freight, a central sector adapted to hold seats to accommodate passengers and a rear sector adapted to hold freight. The central sector here can be equipped with seats set aside for passengers, but it also can be provided here, for example, to have a movie theater, a conference room, etc. . . .

As a general rule, passengers rather are placed in lateral zones so as to be closer to the emergency exits. Nonetheless, passengers also can be provided for in the central zones of the aircraft. It then is appropriate to provide emergency exits accordingly. The fact of having passengers in the central zones likewise makes it possible to optimize the use of the interior space of the fuselage when one wishes to transport a large number of passengers.

Advantageously, more or less vertical walls separate the central zones from each lateral zone, at least in places. In this way, when the lateral zones are holding passengers and the central zones freight, the passengers are separated from the freight.

AIRCRAFT FUSELAGE AND CORRESPONDING AIRCRAFT

BACKGROUND OF THE INVENTION

1. Field of the Invention

This invention relates to an aircraft fuselage and more particularly to the commercial laying out of such a fuselage.

2. Description of the Related Art

In the currently known airplanes intended for passenager transportation, a fuselage with more or less circular section is equipped with one (or two) deck(s) laid out to accommodate passengers. The space below the lower deck is used as a hold and is laid out for the transport of standardized containers.

Each deck defines the floor of a cabin into which there are integrated rails extending longitudinally. These rails have regularly spaced attachment points. Seats, as well as other units (galleys, storage bins, lavatories, ect . . . ), designated by the general term "monument)("monument" in English) then are attached on these rails.

numerous constraints govern the laying out of an aircraft cabin. Some of them are noted below.

First of all there are standards for passenger comfort, which define in particular the minimal width of the seats as well as the spacing between two successive seats logitudinally. To these standards are added the specifcations characteristic of each airline company.

In terms of safety, it also is appropriate to make sure that a rapid evacuation of the passengers can be conducted. Doors thus are provided regularly along the fuselage in order to permit such an evacuation. The doors are arranged symmetrically on either side of the longitudinal axis of the fuselage. The position of these doors must be compatible with the airport facilities.

The airline companies likewise are connected with maximizing profitability of the flights made. Thus, when it is possible, freight is taken on board at the same time as passengers.

SUMMARY OF THE INVENTION

This invention then has the purpose of providing as aircraft fuselage meeting the standards of comfort and safety for civil aviation, capable of both accommodating a large number of passengers and offering an economic profitability superior to that of known aircraft. The laying out of this fuselage preferably also should permit the rapid evacuation of the passengers in the event of accident.

To this end, it proposes an aircraft fuselage comprising an outer skin and at least one main deck defining an occupancy space in which at least one portion of the occupancy space is divided into at least three longitudinal zones, at least one central zone and at least two lateral zones, in which the lateral zones are adapted to hold either seats to accommodate passengers, or freight, and in which at least one central zone is adapted to hold freight, at least over one portion of its length.

According to the invention, at least one lateral zone comprises an aisle for the passage in a transverse direction of the freight placed in a central zone.

Such a layout of an aircraft fuselage makes it possible to maximize the profitability of an aircraft. The lateral zones are adjustable and can hold freight or passengers. The laying out of these zones thus can be modified on request. The same aircraft then can be used for passenger transportation or else as a cargo plane. The layout proposed here is entirely original because for the first time it provides for accommodating passengers and freight at the same time on the same aircraft Aisles for passage preferably are provided in the central zones in order to connect the two lateral zones. Such aisles permit a better traffic flow in the fuselage of the aircraft, in particular for the commercial flight personnel.

In order to make a fuselage according to the invention more easily adjustable, this fuselage comprises, for example, at least one plateau on which several seats intended to hold passengers are attached, this plateau itself being equipped with attachment means permitting attachment thereof on the main deck. Such a plateau then becomes positioned in the fuselage of the aircraft like a pallet or another freight container. Spaces for passengers thus can be put in place and removed from the aircraft almost as easily as a pallet (or other container) holding goods is put in place and removed.

To reinforce the structure of a fuselage according to the invention, its outer skin preferably is lined with an inner skin. In this embodiment, it also can be provided that longitudinal ribs connect the upper portion of the inner skin to the lower portion thereof and thus define the longitudinal zones of the occupancy space. These longitudinal ribs are, for example, in the form of connecting rods.

In a first embodiment of a fuselage according to the invention, the space above the main deck defines an occupancy space making it possible to accommodate passengers and/or freight, according to preference, and the space below the main deck is a hold.

In a second embodiment of a fuselage according to the invention, the space above the main deck defines an occupancy space making it possible to accommodate passengers and/or freight, according to preference, and the space below the main deck itself also defines an occupancy space making it possible to accommodate passengers and/or freight, according to preference.

These two embodiments correspond to two aircraft of different types. The first embodiment makes it possible to favor the transport of goods, while the second embodiment makes it possible to have an aircraft capable of transporting a very large number of passengers. This clearly shows how the invention makes it possible to have an economically profitable aircraft just as easily for an aircraft intended in particular for passenger transportation as for an aircraft intended in particular for the transport of goods.

This invention also relates to an aircraft, characterized in that it comprises a fuselage such as described above.

BRIEF DESCRIPTION OF THE DRAWINGS

Details and advantages of this invention will emerge more clearly from the description that follows, drawn up with reference to the attached schematic drawings, in which.

DETAILED DESCRIPTION OF THE PREFERRED EMBODIMENTS

Figure 1:
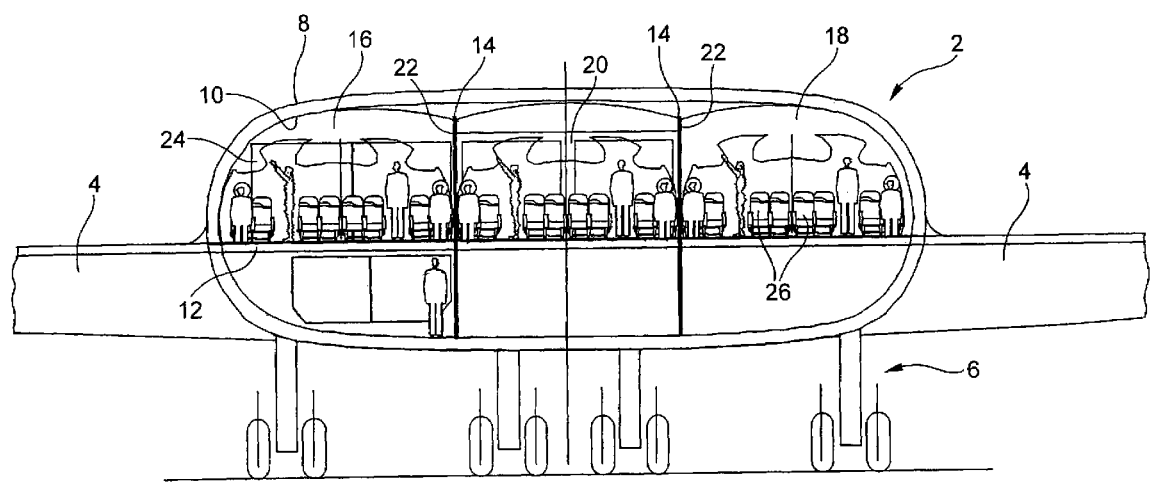
FIG. 1 is a partial cross-sectional view of an aircraft according to the invention.

The drawings depict in part an airplane comprising a fuselage 2, wings 4 and a landing gear 6 (FIG. 1). The invention described relates more particularly to the fuselage 2 and its interior laying out. For this reason the wings, the engines and other components of the airplane have not been depicted. The fuselage 2 is classically of tubular form. In the example of the drawings, this fuselage 2 has on its periphery a double skin, an outer skin 8 and an inner skin 10. Inside the fuselage is a main deck 12, separating the interior space of the fuselage longitudinally into two spaces.

The original shape of the fuselage is noted in the drawing (FIG. 1, for example). This is of more or less oval shape, the main axis of the oval being horizontal.

With regard to orientation, throughout the description it is assumed that the aircraft is set down on a more or less horizontal runway. Thus more or less horizontal planes are defined, such as that of the main deck as well as a high/low orientation, the landing gear 6, of course, being in low position in relation to the fuselage 2.

In order to make the structure of the fuselage rigid, more or less vertical longitudinal ribs 14 connect the upper portion of the inner skin 10 to the lower portion of this same inner skin 10. These longitudinal ribs 14 are, for example, in the form of connecting rods.

Figure 2:
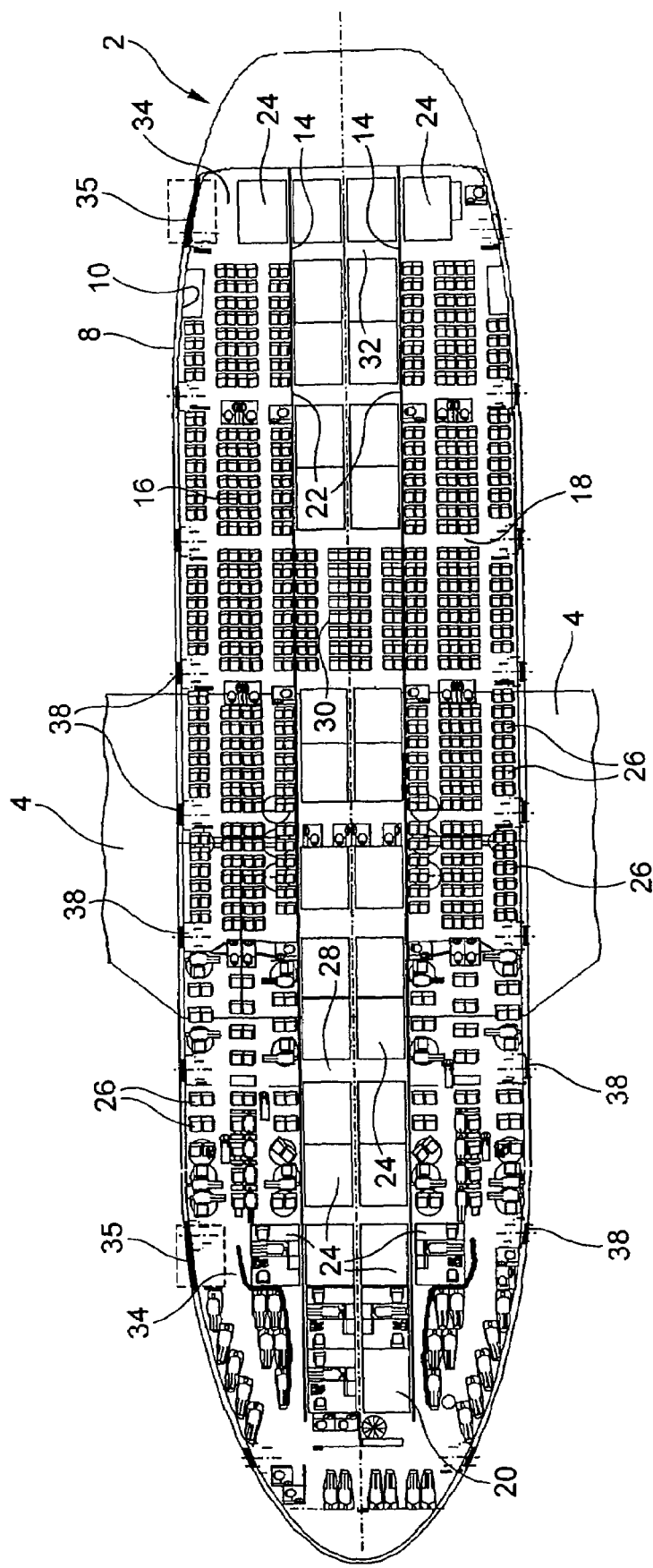
FIG. 2 is a view from above of the main deck of the aircraft of FIG. 1.
Figure 3:
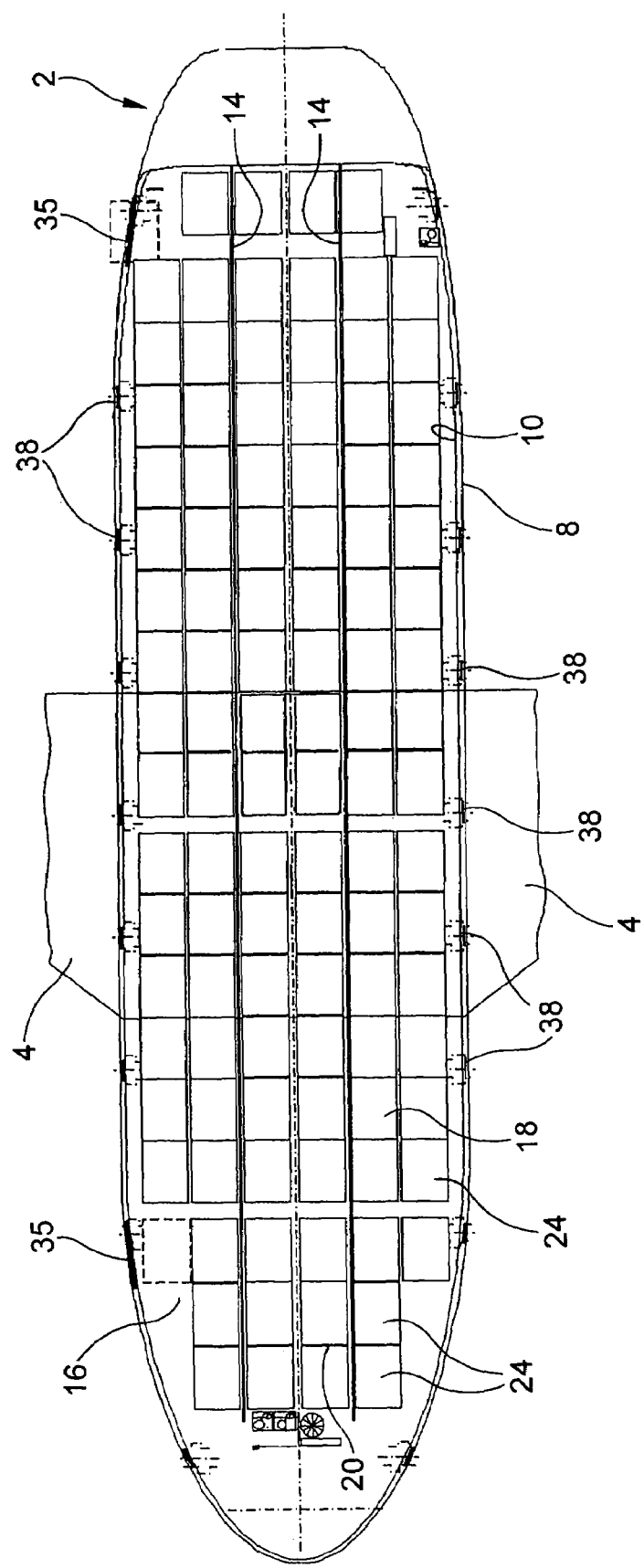
FIG. 3 is a view corresponding to that of FIG. 2 when the main deck depicted is intended solely for the transport of freight.

FIGS. 1 to 3 depict a possible laying out of the fuselage space arranged above the main deck 12. The fuselage depicted in these figures, in accordance with the invention, comprises an occupancy space divided into at least three longitudinal zones; at least one central zone and at least two lateral zones. The latter are intended to hold either seats for accommodating passengers (FIGS. 1 and 2), or freight (FIG. 3). They also can hold freight and passengers at the same time (form of laying out not depicted in the figures).

In the particular embodiment of the invention depicted in FIG. 2, the fuselage space arranged above the main deck 12 is divided into three longitudinal zones; a right zone 16, a left zone 18 and a central zone 20. These zones are separated from each other by walls 22. The separation between two neighboring zones corresponds to the passage of the longitudinal ribs 14. Thus the walls 22 cover these ribs.

In the embodiment depicted in FIG. 2, the central zone 20 is intended for the transport of freight and passengers at the same time. Pallets 24 as well as seats 26 allowing it to accommodate passengers therefore have been depicted in this central zone 20. This central zone 20 here is divided into three sectors: a front sector 28, a central sector 30 and a rear sector 32. The front and rear sectors 28 and 32 are adapted to hold freight, such as pallets 24, while the central sector 30 comprises seats 26.

As for the right and left zones 16 and 18, they are equipped (almost) exclusively with seats 26. It is noted in FIG. 2 that four pallets 24 are in the lateral zones. Two of these four pallets, the ones arranged at the rear of the aircraft, are intended for the transport of freight, while the other two, at the front of the aircraft, are modules forming a cabin. Here it is a matter of a preferred variation.

Pallets 24 located in the central zone are positioned in the latter after having traversed the right zone 16. For each of the front and rear sectors 28 and 32, an access aisle 34 traversing the right zone 16 is provided. These access aisles 34 extend crosswise in relation to the axis of the fuselage 2. On the side of the lateral wall of the fuselage, they open onto a large-sized door 35 permitting the introduction of removal of a pallet 24.

Here seats 26 have not been provided at the access aisles 34 in order not to hamper the loading and unloading of the pallets 24. The space thus set aside for the passage of the pallets 24 transported in the central zone 20, however, may be used to transport a pallet 24. Preferably it is advisable to avoid completely obstructing the access aisle 34 with pallets so as to leave a passage for moving from the front to the rear of the right zone 16 or vice versa.

For reasons of symmetry, a pallet also is arranged in the left zone 18 level with the access aisle 34. The access aisle 34 allowing access to the front sector 28 then implements, for example, the separation between a first-class compartment and an economy-class compartment. The pallet 24 then located in the left zone 18 at the access aisle 34 allowing access to the front sector 28 then implements the separation between a first-class or a business-class compartment and an economy-class compartment. As for the access aisle 34 corresponding to the rear sector 32, it is, for example, as depicted in the variation of FIG. 2, placed as far to the rear as possible in the aircraft.

In the walls 22 openings 36 are provided, thus effecting a communication between the central zone 20 and the lateral zones, that is, the right zone 16 and the left zone 18. In addition, the pallets 24 are secured so that a passage is left clear at the openings 36. In this way it is possible to access the left zone 18 quite directly from the right zone 16 and vice versa.

Pallets 24, for example, can contain freight. Nonetheless, equipping certain pallets, for example, with kitchens (generally referred to under the English term "galley") or with a bedding space for the crew or with a storage space, etc. also can be considered. The pallets 24 so equipped of course preferably are located close to an opening 36.

In order to permit evacuation of the passengers, doors 38, in addition to doors 35, are arranged regularly in the lateral wall of the fuselage 2. In the embodiment depicted in the drawing, doors 35 and 38, completely novel, are noted on each side of the fuselage 2.

In the embodiment of FIGS. 1 and 2, it is possible to accommodate up to nine hundred ninety passengers. There then are attained one hundred ten passengers per door, which is in accordance with current safety standards.

FIG. 3 is a view corresponding to FIG. 2 that shows the same aircraft, but here the main deck is equipped to hold only freight, packed, for example, in pallets 24. In this layout, more than a hundred pallets can be accommodated on the main deck 12 of the aircraft of FIGS. 1 to 4.

Figure 4:
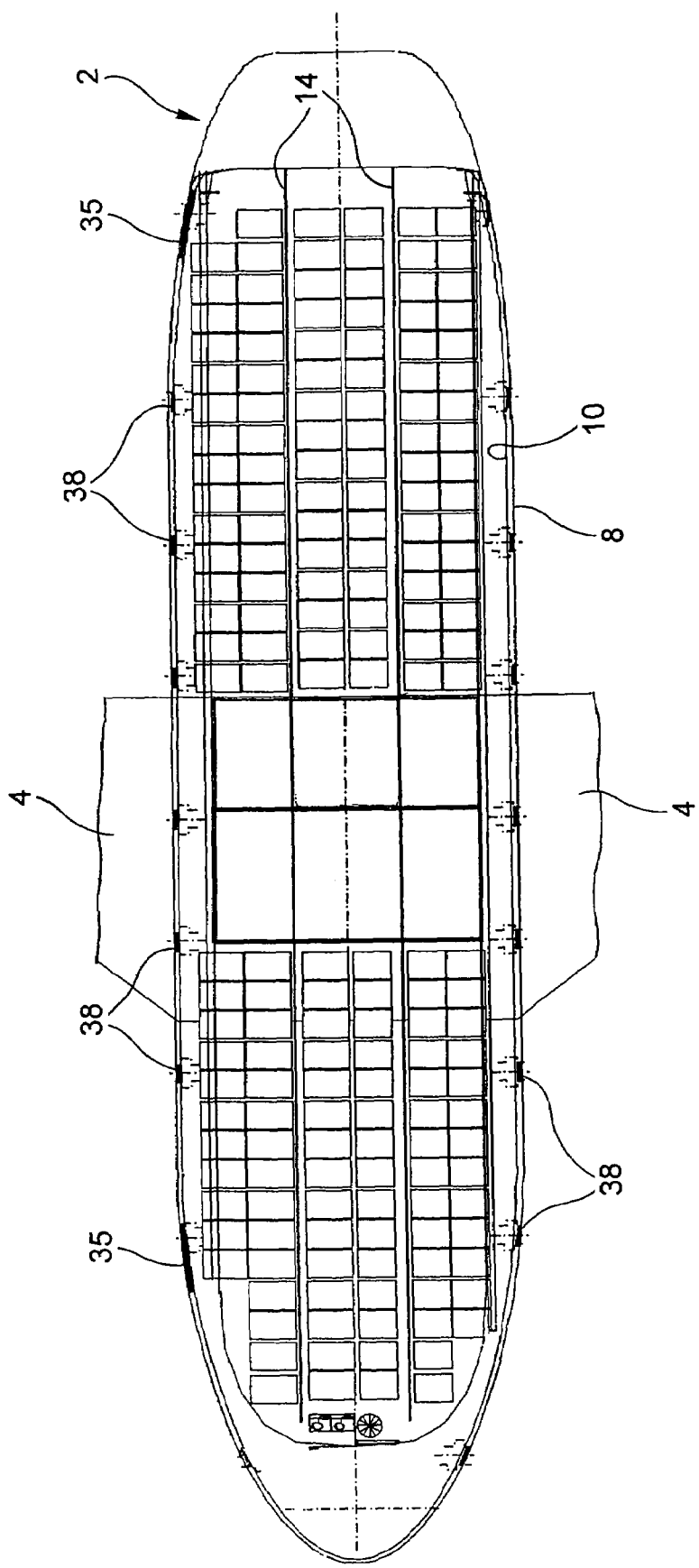
FIG. 4 depicts the hold of the aircraft of FIGS. 2 and 3.

As for FIG. 4, it shows the laying out of the hold of the aircraft of FIGS. 1 to 4. As can be seen in FIG. 1, the portion above the main deck 12 has a greater height than the portion located below this main deck. The portion below the main deck serves here as a hold to accommodate, as is often the case on aircraft, containers known, for example, under the designations LD-1, LD-3 or LD-8 (or others). In relation to other known airplanes, the hold here is laid out in three longitudinal zones and thus makes it possible to accommodate at least three times more containers than a hold of the same length in another airplane allows.

It thus is noted that in a cargo version, that is, for example, with pallets 24 on the main deck 12 and containers in the hold, the aircraft described here has a very significant loading capacity, far greater than the capacity of cargo planes in service at the time of filing of this patent application.

Figure 5:
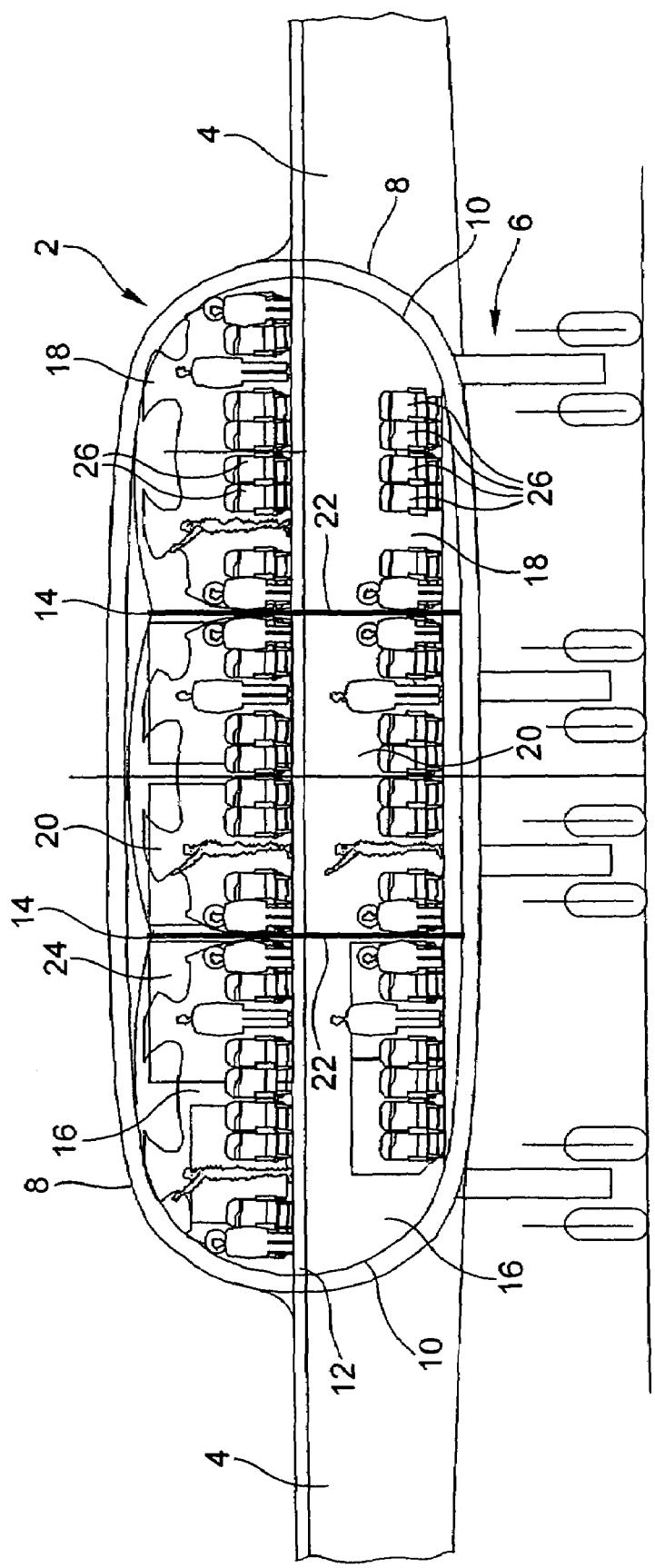
FIG. 5 is a view corresponding to that of FIG. 1 for a variation of the invention.

FIG. 5 is a view corresponding to FIG. 1 for a variation of an airplane according to the invention. In this embodiment, the main deck 12 separates the fuselage 2 into two spaces having more or less the same height. These two spaces then are equipped in a more or less identical manner. Thus a double-deck airplane is implemented. The lower deck, like the upper deck, is divided into three adjustable longitudinal zones, as is the deck depicted in FIG. 2. It is clear that such an aircraft then can transport a number of passengers well above one thousand. It also can accommodate a very significant number of pallets.

Of course, when the same aircraft changes from a layout in which it can hold passengers to a layout in which it is intended to transport freight, or vice versa, the seats 26 must be installed or removed. Here it is not a matter of dismantling the seats one by one each time. Sets of seats are attached on a base forming a plateau that then is secured on the deck for which it is intended, in the same manner as a pallet. A set of seats thus becomes installed in more or less the same manner as a pallet 24 or a container becomes positioned.

The aircraft described above offer the feature of having "cargo" type doors 35 including at a level intended to hold passengers. As a matter of fact, in original manner, freight and passengers can travel at the same time on the same deck. Comfort units for passengers also can be arranged in the zones set aside for freight. These units thus are immediately accessible during a trip. Sanitary facilities (showers or bathrooms), individual cubicles, or else also storage spaces, galleys, rest zones for the crew (generally known under the term "crew rest"), etc. also can be provided here. Such an adjustment capability does not yet exist on any aircraft.

The solution described above also makes it possible to have a fairly short installation time. This installation time is entirely compatible with the duration of stopovers. The attachment points that generally are found on the floor of aircraft for the attachment of seats or the securing of freight can be used here.

The layouts described above are compatible with the standard units already used aboard aircraft at the present time.

In terms of safety, all the current standards can be met with an aircraft such as those described above. The fact of preferably placing passengers in the right and left lateral zones makes it possible to optimize the time for evacuation of an aircraft in the event of accident. The passengers are closest to the emergency exits, and the freight and other units (comfort modules, etc.) are positioned at the center of the aircraft, that is, at the place farthest from the emergency exits.

The layout of FIG. 2 makes it possible to facilitate the task of the crew. The galleys can be amid the passengers. The walking length then is optimized for the commercial flight personnel. Meal service then can be performed in a reduced time. The considerable space of the central zone also can be used for storage. Thus a storage capacity clearly greater than that of aircraft of the prior art is obtained in such an aircraft. All this contributes to increasing the economic profitability of the aircraft.

New services may be considered aboard an aircraft according to the invention. It is conceivable, for example, to implement a self service in the airplane. This would make it possible to require, or at the very least to encourage, the passengers to move about in the airplane, which, as is known, is favorable for the health of the passengers on long-distance flights. Having a conference room, a communications center, an infirmary, a play area for children, etc. also can be considered.

The fuselage described has several adjustable longitudinal zones. Each of these zones just as easily can hold only freight, or only passengers, or passengers and freight at the same time. When freight and passengers are positioned in such an aircraft, the passengers preferably are placed in the lateral zones and the freight in the central zones of the fuselage in order to favor the evacuation times for passengers in the event of accident.

This invention is not confined to the embodiments described above by way of non-limitative examples. It also relates to all the variations within the capacity of the individual skilled in the trade in the context of the claims below.

Thus in the two embodiments described, the fuselage is divided into three longitudinal zones. Depending on the size of the fuselage, however, a larger number of longitudinal zones could be provided. Likewise, one embodiment of the description above provides for a main deck separating a hold from a cabin and another embodiment provides for two cabins arranged one above the other with a lower deck and an upper deck. Other variations are conceivable, for example with a third deck or else a hold underneath two decks provided for the possible transport of passengers.

In addition, various forms for implementation of pallets are described. These can comprise, according to preference:
- seats 26
- facilities for passenger comfort (lavatories, galley, storage for cabin baggage, beds or berths, etc. . . . )
- means suitable for holding freight, such as containers.

The pallets can assume various forms: containers, plateaus, . . . It suffices that they work together with the longitudinal limits of the fuselage for attributing a purpose thereto: passenger space, galley space, freight space, storage space.

The invention claimed is:

1. An aircraft fuselage, comprising:
an outer skin; and
a single continuous main deck separating an interior space of the aircraft fuselage longitudinally into a first space above said single continuous main deck and a second space below said single continuous main deck,
wherein at least one portion of the first space is divided into at least three longitudinal zones by a plurality of substantially vertical walls, said at least three longitudinal zones including at least one central zone and at least two lateral zones,
wherein the at least one central zone is divided into three sectors, said three sectors including a front sector, a central sector, and a rear sector,
wherein the at least two lateral zones include a first plurality of seats attached, either directly or indirectly, to the at least one main deck in a first lateral zone configuration, and are free of said plurality of seats in a second lateral zone configuration,
wherein said front sector and said rear sector of the at least one central zone is configured to hold only freight, wherein freight does not include passengers, and
wherein said central sector of the at least one central zone includes a second plurality of seats attached, either directly or indirectly, to the at least one main deck in a first central sector configuration, and is free of said second plurality of seats in a second central sector configuration.

2. An aircraft fuselage according to claim 1, wherein said central sector is in said first central sector configuration.

3. An aircraft fuselage according to claim 1, wherein aisles are provided in the at least one central zone that connect to the at least two lateral zones.

4. An aircraft fuselage according to claim 1, further comprising at least one plateau on which several seats configured to hold passengers are attached, the plateau including attachment equipment configured to attach the plateau to the main deck.

5. An aircraft fuselage according to claim 1, wherein said outer skin is lined with an inner skin.

6. An aircraft fuselage according to claim 5, further comprising longitudinal ribs configured to connect the upper portion of the inner skin to the lower portion thereof.

7. An aircraft fuselage according to claim 6, wherein the longitudinal ribs comprise connecting rods.

8. An aircraft fuselage according to claim 1, wherein the first space above the at least one main deck is an occupancy space configured to accommodate passengers, freight, or any combination thereof, and the second space below the main deck is a hold configured to accommodate at least containers under the designation LD-1, LD-3, and LD-8.

9. An aircraft fuselage according to claim 1, wherein the first space above the at least one main deck is a first occupancy space configured to accommodate passengers, freight, or any combination thereof, and the second space below the main deck is a second occupancy space configured to accommodate passengers, freight, or any combination thereof.

10. An aircraft, comprising a fuselage according to claim 1.

11. An aircraft fuselage according to claim 1, further comprising at least one access aisle traversing at least one of the at least two lateral zones,
wherein the at least one access aisle extends substantially crosswise in relation to a longitudinal axis of said fuselage, and
wherein the at least one access aisle is at least large enough to accommodate the passage of a pallet including freight.

12. An aircraft fuselage according to claim 11, further comprising at least one door located on a lateral wall of said fuselage that connects to the at least one access aisle.

13. An aircraft fuselage according to claim 1, wherein said at least two lateral zones are in said first lateral configuration and said central sector is in said first central sector configuration.

14. An aircraft fuselage according to claim 1, wherein said at least two lateral zones are in said second lateral configuration and said central sector is in said second central sector configuration.

15. An aircraft fuselage according to claim 1, wherein said at least two lateral zones are in said first lateral configuration and said central sector is in said second central sector configuration.

16. An aircraft fuselage according to claim 1, wherein said at least two lateral zones are further divided to include at least one first lateral zone in said first lateral zone configuration and at least one second lateral zone in said second lateral zone configuration.

17. An aircraft fuselage according to claim 1, wherein the second space below the main deck includes three longitudinal zones, each being configured to accommodate at least containers under the designation LD-1, LD-3, and LD-8.

18. An aircraft fuselage according to claim 1, wherein at least one of said three sectors of said at least one central zone is configured to accommodate at least containers under the designation LD-1, LD-3, and LD-8.

19. An aircraft fuselage according to claim 18, wherein said front and rear sectors are configured to accommodate at least containers under the designation LD-1, LD-3, and LD-8.

20. An aircraft fuselage according to claim 19, wherein said at least two lateral zones are in said first lateral configuration and said central sector is in said first central sector configuration.

21. An aircraft fuselage, comprising:
an outer skin; and
a single continuous main deck separating an interior space of the aircraft fuselage longitudinally into a first space above said single continuous main deck and a second space below said single continuous main deck,
wherein at least one portion of the first space is divided into at least three longitudinal zones by a plurality of walls, said at least three longitudinal zones including at least one central zone and at least two lateral zones, wherein the at least one central zone is divided into three sectors, said three sectors including a front sector, a central sector, and a rear sector, wherein the at least two lateral zones and the central zone include a plurality of seats attached, either directly or indirectly, to the at least one main deck, wherein the front sector and the rear sector include a plurality of pallets attached, either directly or indirectly, to the single continuous main deck, and wherein said plurality of pallets are configured to secure only freight, wherein freight does not include seats configured to hold passengers.

22. An aircraft fuselage according to claim 21, wherein the plurality of pallets are configured to accommodate at least containers under the designation LD-1, LD-3, and LD-8.

23. An aircraft fuselage according to claim 1, wherein said single continuous main deck extends below each of said at least three longitudinal zones.

24. An aircraft fuselage according to claim 5, wherein said plurality of walls that divide said first space into said at least three longitudinal zones cover a plurality of ribs that extend from an upper portion of said inner skin located in said first space to a lower portion of said inner skin in said second space.

25. An aircraft fuselage according to claim 1, wherein said fuselage is a single tubular fuselage that includes an oval cross-section, and wherein said single continuous main deck extends from a first lateral side wall of said fuselage to a second lateral sidewall of said fuselage located on an opposite side of said fuselage.

26. An aircraft fuselage according to claim 21, wherein said single continuous main deck extends below each of said at least three longitudinal zones.

27. An aircraft fuselage according to claim 21, wherein said outer skin is lined with an inner skin, and wherein said plurality of walls that divide said first space into said at least three longitudinal zones cover a plurality of ribs that extend from an upper portion of said inner skin located in said first space to a lower portion of said inner skin in said second space.

* * * * *